United States Patent [19]

Yasuhara

[11] Patent Number: 4,626,230

[45] Date of Patent: Dec. 2, 1986

[54] DEVICE FOR SENSING DAMAGE TO A COGGED BELT

[75] Inventor: Seishi Yasuhara, Yokosuka, Japan

[73] Assignee: Nissan Motor Company, Limited, Kanagawa, Japan

[21] Appl. No.: 622,443

[22] Filed: Jun. 20, 1984

[30] Foreign Application Priority Data

Jun. 30, 1983 [JP] Japan .................................. 58-118579
Sep. 12, 1983 [JP] Japan .................................. 58-168075
Jan. 10, 1984 [JP] Japan ..................................... 59-2514
Mar. 22, 1984 [JP] Japan ................................... 59-55072

[51] Int. Cl.[4] .............................................. F16G 1/28
[52] U.S. Cl. ..................................... 474/106; 474/273
[58] Field of Search ................ 474/106, 273; 198/810, 198/502.1, 856; 73/7, 159, 162; 200/61.41, 61.13, 61.15, 61.17, 61.42, 153 P, 153 T

[56] References Cited

U.S. PATENT DOCUMENTS

| | | | |
|---|---|---|---|
| 1,481,471 | 1/1924 | LaLonde | 474/273 X |
| 2,291,027 | 7/1942 | Cole | 73/159 |
| 2,345,415 | 3/1944 | Nagy, Jr. | 198/810 X |
| 2,371,506 | 3/1945 | Cotton | 200/61.41 |
| 2,677,969 | 5/1954 | Waugh | 474/249 |
| 2,997,556 | 8/1961 | Anderson | 200/61.41 |
| 3,659,472 | 5/1972 | Engels | 474/273 X |
| 4,462,523 | 7/1984 | Kerr | 198/856 X |

Primary Examiner—Stephen J. Novosad
Assistant Examiner—Matthew Smith
Attorney, Agent, or Firm—Schwartz, Jeffery, Schwaab, Mack, Blumenthal & Evans

[57] ABSTRACT

A pulley has evenly spaced grooves. A belt is formed with evenly spaced teeth which mesh with the grooves on the pulley. A device senses deformation of the belt resulting from damage to at least one of the teeth on the belt. The device may sense an opening between the belt and the pulley which results from breakage of at least one of the teeth on the belt. When such displacement or an opening is detected, an indicator lamp is lit to report that the belt should be replaced.

7 Claims, 35 Drawing Figures

DEVICE FOR SENSING DAMAGE TO A COGGED BELT

BACKGROUND OF THE INVENTION

1. Field of the Invention

This invention relates to a device for sensing damage to a tooth on a cogged belt, such as a timing belt.

2. Description of the Prior Art

In automotive diesel engines, a combination of a synchronous belt and pulleys is customarily used to couple the engine crankshaft to the engine camshaft and the drive shaft of a fuel injection pump. The belt has evenly spaced teeth on its inner surface which mesh with grooves on the pulleys to produce a positive, no-slip driving effect. Such belts are commonly called timing belts.

Timing belts are generally made of rubber, thus reducing noise and avoiding the need for a lubricating bath or oiling system which would be necessary in the case of chains or gears. Since the material of the belts is rubber, the service life of such belts is shorter than that of the main bodies of the engines. In final stages thereof, individual teeth break off the belt, which can result in slippage between the belts and the pulleys and thus disruption of fuel injection timing and opening and closing timing of the inlet and outlet valves in the engine cylinders.

In order to prevent such slippage, such belts are commonly visually inspected periodically, or are replaced periodically even if there is no damage to the belts.

SUMMARY OF THE INVENTION

It is an object of this invention to provide a device for automatically sensing damage to teeth on a cogged belt, such as a timing belt.

In accordance with this invention, a pulley has evenly spaced grooves. A belt is formed with evenly spaced teeth which mesh with the grooves on the pulley. A device senses deformation of the belt resulting from damage to at least one of the teeth on the belt. The device may sense an opening between the belt and the pulley which results from breakage of at least one of the teeth on the belt.

The above and other objects, features and advantages of this invention will be apparent from the following description of preferred and alternative embodiments thereof, taken in conjunction with the drawings.

BRIEF DESCRIPTION OF THE DRAWINGS

Like and corresponding elements are denoted by the same reference numerals throughout the drawings.

DESCRIPTION OF THE PREFERRED EMBODIMENTS

Figure 1:
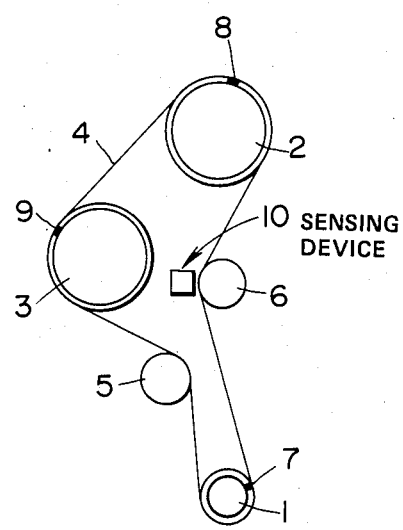
FIG. 1 is a diagram of a combination of pulleys and a belt to which a sensing device of a first embodiment of this invention is applied.
Figure 2:
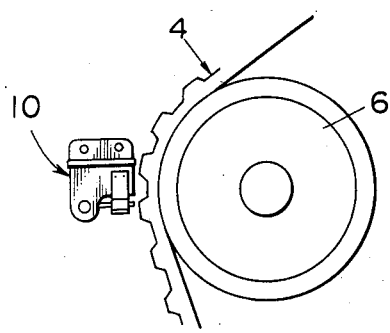
FIG. 2 is an enlarged view of the sensing device, the belt, and the idler pulley of FIG. 1.

With reference to FIG. 1, a crank pulley 1 is mounted on the crankshaft of a diesel engine. A cam pulley 2 is mounted on the camshaft of the engine. A pump pulley 3 is mounted on the drive shaft of a fuel injection pump.

These pulleys 1, 2, and 3 have evenly spaced grooves crossing their peripheral surfaces. An endless timing belt 4 engages the pulleys 1, 2, and 3. The belt 4 has evenly spaced teeth on its inner surface which mesh with the grooves on the pulleys 1, 2, and 3. Specifically, the teeth on the belt 4 have a pitch equal to that of the grooves on the pulleys 1, 2, and 3. As the engine crankshaft rotates, the crank pulley 1 is rotated so that the belt 4 is moved. This movement of the belt 4 causes the cam pulley 2 and the pump pulley 3 to rotate synchronously with rotation of the crank pulley 1, thereby also rotating the engine camshaft and the pump drive shaft. In this way, rotation of the engine crankshaft causes synchronous rotation of the engine camshaft and the pump drive shaft.

Idler pulleys 5 and 6 engage the outer surface of the belt 4. The idler pulleys 5 and 6 restrain the belt 4 inwardly so that the belt 4 remains at an optimum tension independent of the magnitude of load on the belt 4.

A first pair of mating marks 7 are formed on the belt 4 and the crank pulley 1. A second pair of mating marks 8 are formed on the belt 4 and the cam pulley 2. A third pair of mating marks 9 are formed on the belt 4 and the pump pulley 3. Each pair of these marks 7, 8, and 9 are designed so that the phase relationships between each pair of marks 7, 8 and 9 remain constant as long as the pulleys 1, 2 and 3 continue to rotate synchronous, i.e., as long as no one pulley slips with respect to the belt.

A device 10 serves to sense damage to at least one of the teeth on the belt 4. The sensing device 10 faces the inner surface of the belt 4 opposite the idler pulley 6.

FIGS. 2, 3, 4, 5, 6, and 7 show the details of the sensing device 10. The sensing device 10 has a U-shaped main body 11 made of metal. The sensing device body 11 is securely attached to the engine block by means of a metal bracket 12. A stay 14 securely extends between the parallel walls of the main body 11 to prevent deformation of the main body 11.

A sensing probe 15 is pivotally mounted on the main body 11. Specifically, a pivot pin 16 extends between the free edges of the parallel walls of the main body 11 and is supported by the body 11. The pin 16 runs parallel to the axis of the idler pulley 6 and thus perpendicular to the direction of movement of the belt 4. The sensing probe 15 has the form of a rectangular plate. One edge of the sensing probe 15 is rotatably mounted on the pin 16. The opposite free edge 17 of the sensing probe 15 extends parallel to the axis of the idler pulley 6 and normally lies just inside the belt 4. The length of the free edge 17 equals the length of the teeth on the belt 4 so that the free edge 17 covers the entire length of each tooth on the belt 4. The other parts of opposing edges of the sensing probe 15 each have an engagement section 18. The sensing probe 15 has a central opening 19 extending therethrough. This opening 19 serves to relieve any air pressure gradient across the sensing probe 15. The sensing probe 15 is made of an electrically insulating material, such as plastic.

Figure 4:
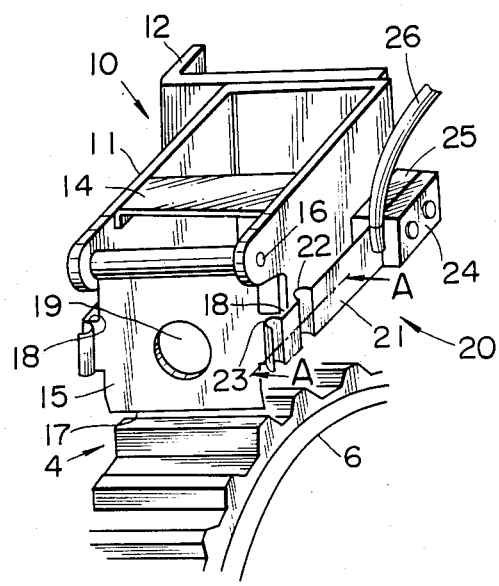
FIG. 4 is a perspective view of the sensing device, the belt, and the idler pulley of FIG. 1.
Figure 5:
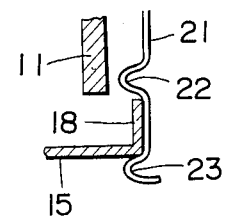
FIG. 5 is a cross-sectional view taken along the line A—A of FIG. 4.

A switch 20 includes a flexible contact strip 21 extending parallel to the outer surface of one of the opposite walls of the main body 11. One end of the movable contact strip 21 is securely sandwiched between a pair of insulating members 24 and 25. The insulating members 24 and 25 are fixed to the outer surface of the corresponding wall of the main body 11 so that the end of the movable contact strip 21 is secured to the main body 11 but is electrically insulated from the main body 11. The movable contact strip 21 is made of resilient metal, such as phosphor bronze. As best shown in FIGS. 4 and 5, the other free end of the movable contact strip 21 is provided with a contacting section 22 projecting toward the main body 11. The contact projection 22 is in the form of a hairpin bend in the contact strip 21. The contact projection 22 may alternatively be composed of a separate member mounted on the main portion of the contact strip 21.

The engagement section 18 of the sensing probe 15 normally engages the free end of the movable contact strip 21 to hold the strip 21 away from the main body 11 so that the contact projection 22 is out of contact with the main body 11. When the sensing probe 15 pivots downward as viewed in FIG. 5 and disengages from the movable contact strip 21, the contact strip 21 moves into contact with the main body 11 due to its resiliency. In this way, the main body 11 forms a fixed contact of the switch 20 to which the movable contact strip 21 is electrically connectable.

The free edge of the movable contact strip 21 is shaped into an easily releasable hook 23. When the sensing probe 15 is in its normal position as shown in FIG. 5, the hook 23 gently holds the engagement section 18 of the sensing probe 15 in its normal position in cooperation with the contact projection 22. The hook 23 is designed to allow easy movement of the sensing probe 15 out of its normal position. In moving from its normal position, the engagement section 18 of the sensing probe 15 pushes the hook 23 aside and then disengages completely from the hook 23. After disengagement of the sensing probe 15 from the hook 23, the hook 23 prevents the sensing probe 15 from returning to its normal position. One end of electrical lead 26 is connected to the base end of the movable contact strip 21. An electrical connection to the movable contact is established via this lead 26. An electrical connection to the fixed contact, i.e. to ground, is established via the main body 11 and the bracket 12.

Figure 3:
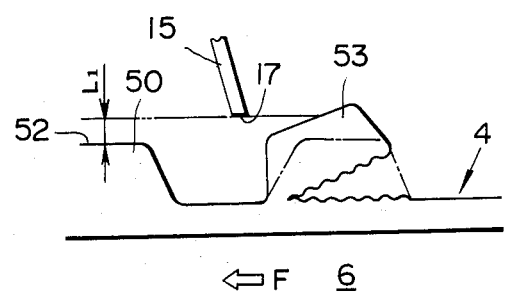
FIG. 3 is a side view of the sensor probe, the belt, and the idler pulley of FIG. 2.

As shown in FIG. 3, when the sensing probe 15 is in its normal position, the direction of the sensing probe 15 from its free edge 17 to its pivoted end is at a relatively large acute angle with respect to the direction F of movement of the belt 4. In the same case, the free edge 17 of the sensing probe 15 is separated from the top surfaces 52 of the teeth 53 on the belt 4 by a predetermined distance L1 measured perpendicular to direction F. This distance L1 is chosen so that when a tooth 53 on the belt 4 breaks and is displaced upward as viewed in FIG. 3, the free edge 17 of the sensing probe 15 will strike the broken tooth 53 and be thrust leftwards, as viewed in FIG. 3, by the broken tooth 53. Note that during movement about the idler pulley 6, the belt 4 is subjected to a centrifugal force which displaces the broken tooth 53 upwards as viewed in FIG. 3.

Figure 6:
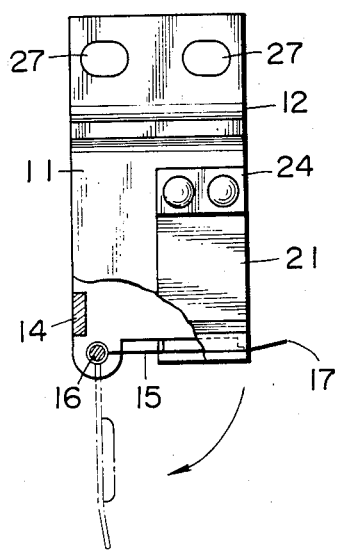
FIG. 6 is a front view of the sensing device of FIG. 4.

As shown in FIG. 6, the bracket 12 is formed with apertures 27 through which bolts or screws (not shown) pass to secure the bracket 12 to the engine block. Each of the apertures 27 is elongated in the direction of the distance L1 so that the distance L1 can be precisely adjusted. When the sensing probe 15 is displaced from its normal position to another position, as illustrated by the broken lines in FIG. 6, by encounter with a broken tooth 53, the sensing probe 15 disengages from the movable contact strip 21 and thereby allows the contact strip 21 to move into contact with the main body 11. In this way, the switch 20 is closed.

Figure 7:
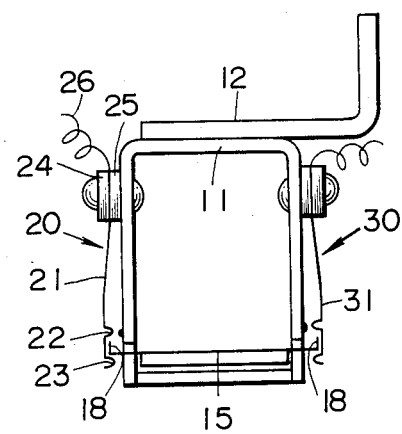
FIG. 7 is a side view of the sensing device of FIG. 4.

As best shown in FIG. 7, another switch 30 is attached to the opposite wall of the main body 11. This switch 30 is designed in a manner similar to and symmetrical with the switch 20. The switch 30 includes a movable contact strip 31 which is engageable with the engagement section 18 on the opposite edge of the sensing probe 15.

Figure 8:
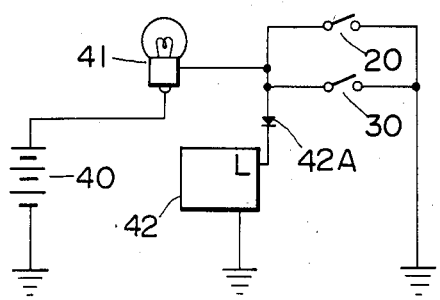
FIG. 8 is a diagram of an electrical circuit including the switches of FIG. 7.

As illustrated in FIG. 8, the switches 20 and 30 are electrically connected in parallel. One end of this parallel combination is grounded and the other end is connected to the positive terminal of an electric power source 40 via an electric bulb or light 41. The negative terminal of the power source 40 is also grounded. In the case of a vehicle engine, the light 41 is located on the instrument panel inside the vehicle.

When one or both of the switches 20 and 30 are closed by the broken and upwardly-displaced tooth 53, the bulb 41 is electrically activated by the power source 40 and thereby emits light as an indication of damage to the belt 4. A voltage regulator 42 for an engine alternator is connected across the power source 40 via a diode 42A and the bulb 41. At the start of the engine, a current normally flows from the power source 40 to the voltage regulator 42 via the bulb 41 so that the bulb 41 will be activated to emit light. This light reports that the bulb 41 is not broken and is operating properly. After the engine has been started, substantially no current flows through the bulb 41 and thereby the bulb 41 is deactivated, provided that neither of the switches 20 and 30 is closed.

In operation, when the base of a tooth 53 on the belt 4 breaks and hence the broken tooth 53 is displaced upwards from its normal position, as illustrated by the broken lines in FIG. 3, to another position, as illustrated by the solid lines in the same drawing, the broken tooth 53 strikes the free edge 17 of the sensing probe 15. As a result of this collision, the sensing probe 15 is thrust leftwards as viewed in FIG. 3 and pushes the hook 23 (see FIG. 5) aside, disengaging from the movable contact strip 21. When the sensing probe 15 disengages from the contact strip 21, the contact strip 21 comes into contact with the main body 11, thereby closing the switch 20. At the same time, the other switch 30 is also closed. The closing of the switches 20 and 30 enables the bulb 41 to emit light as an indication of the damage to the belt 4, which urges an engine operator to replace the belt 4.

Since the free edge 17 of the sensing probe 15 covers the entire length of each tooth on the belt 4 as described previously, the sensing probe 15 reliably responds to tooth damage regardless of where breakage occurs. As a result, the switches 20 and 30 reliably sense damage to the tooth independent of the point of breakage.

Since the opening 19 through the sensing probe 15 serves to relieve the air pressure gradient across the sensing probe 15 caused by the moving belt 4, the sensing probe 15 is not subjected to adverse stresses and stably remains in its normal position.

Even when one of the switches 20 and 30 malfunctions, the other switch can sense damage to teeth on the belt 4. Therefore, the provision of the two switches 20 and 30 increases the reliability of tooth damage detection relative to the case where only a single switch is provided.

The movable contact strips 21 and 31 normally exert equal and opposite forces on the sensing probe 15. These forces cancel each other and so stably and accurately hold the sensing probe 15 in its normal position.

It should be noted that only the segment of the sensing probe 15 engageable with the movable contact strip 21 need be made of electrically insulating material. Furthermore, the sensing device 10 may be located near any of the other pulleys 1, 2, 3, and 5.

Figure 9:
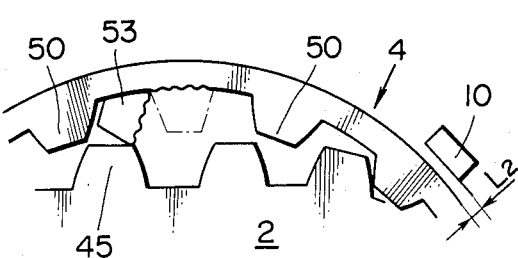
FIG. 9 is a diagram of a cam pulley, a belt, and a sensing device according to a second embodiment of this invention.

FIG. 9 shows a second embodiment of this invention. In this embodiment, the sensing device 10 is located opposite the belt 4 from the cam pulley 2.

When a tooth 53 on the belt 4 breaks, it will tend to pivot from its normal position, as illustrated by the broken lines in FIG. 9, to another position, as illustrated by the solid lines in the same drawing, at which the broken tooth 53 is sandwiched between the body of the belt 4 and a land or tooth surface 45 on the cam pulley 2 and so forces the body of the belt 4 upwards, as viewed in FIG. 9, relative to the land 45 on the cam pulley 2. The distance L2 between the sensing device 10 and the belt 4 is chosen so that the sensing device 10 responds to such upward displacement of the belt 4. In this way, the device 10 serves to sense the damage to the belt 4. This device also reliably senses slippage of the belt 4 caused by damage to a tooth on the belt 4.

Figure 10:
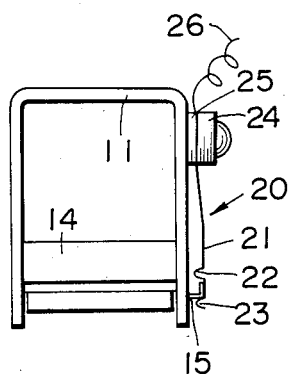
FIG. 10 is a side view of a sensing device according to a third embodiment of this invention.

FIG. 10 shows a third embodiment of this invention. In this embodiment, only one switch 20 is provided. In other words, the switch 30 is eliminated from this embodiment.

Figure 11:
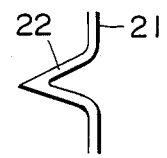
FIG. 11 is a side view of a first modified movable contact strip.

FIG. 11 shows a first modified movable contact strip 21. This contact strip 21 is provided with a sharply pointed contact projection 22. This edged projection 22 prevents dirt or dust from depositing thereon which might otherwise cause malfunction of the switch 20 or 30.

Figure 12:
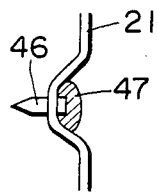
FIG. 12 is a side view of a second modified movable contact strip.

FIG. 12 shows a second modified movable contact strip 21. An electrically conductive pin 46 is fixed to the contact strip 21 by means of solder 47. This pin 46 constitutes a contact projection 22. This contacting pin 46 also prevents accumulation of dirt and dust.

Figure 13:
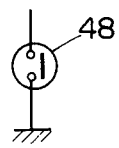
FIG. 13 is a diagram of a fourth embodiment of this invention.

FIG. 13 shows a fourth embodiment of this invention. In this embodiment, an oil pressure switch 48 is used in place of the pressure regulator 42 (see FIG. 8). This switch responds to the oil pressure generated by an engine oil pump. When the engine is first started, the oil pump operates at such a low speed that the oil pressure is lower than the preset level below which the switch 48 is closed. The closing of the switch 48 enables the bulb 41 (see FIG. 8) to emit light indicating that the bulb 41 is not broken. After the engine has been started, the oil pressure rises above the preset level so that the switch 48 is opened. The opening of the switch 48 deactivates the bulb 41, provided that neither of the switches 20 and 30 (see FIG. 8) is closed.

Figure 14:
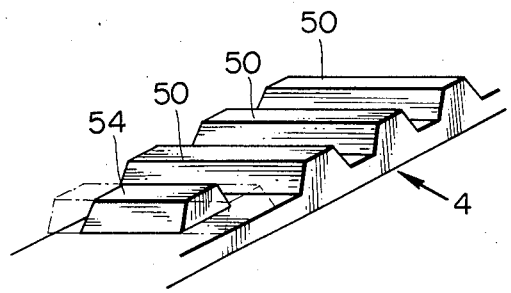
FIG. 14 is a perspective view of a belt according to a fifth embodiment of this invention.

FIG. 14 shows a fifth embodiment of this invention. In this embodiment, the belt 4 is modified. Other elements of this embodiment are similar to those of the embodiment of FIGS. 1 to 8.

The inner working surface of the belt 4 has evenly spaced teeth which mesh with the grooves on the pulleys 1, 2, and 3 (see FIG. 1). The teeth on the belt 4 have a pitch equal to that of the grooves on the pulleys 1, 2, and 3. At least one of the teeth on the belt 4 is shorter than the other teeth, i.e. it does not extend completely across the width of the belt 4. Since this unique tooth 54 is smaller than the other normal teeth 50, the tooth 54 is subjected to stresses greater than those exerted on the others 50. As a result, the unique tooth 54 is more liable to fatigue than the others 50 and will thereby break prior to breakage of the others 50. The breakage of the tooth 54 causes upward displacement of the belt 4 in a way similar to the case of the first embodiment. This upward displacement of the belt 4 is sensed in a way similar to the first embodiment.

The dimension of the tooth 54 is chosen so that it will break immediately before the rated effective service life of the belt 4 expires. Therefore, expiry of the rated life of the belt 4 is automatically sensed beforehand. After the tooth 54 broken, the teeth 50 near the broken tooth 54 bear the load which the tooth 54 bore when whole. Even in this case, undesirable slippage of the belt 4 will not occur.

There may be three unique teeth 54 of varying length of the belt 4. In this case, the service history of the belt 4 can sensed step by step in accordance with ordered breakage of the teeth 54.

Alternatively, the unique tooth 54 may be equal in size to the normal teeth 50, but made of a material more liable to break than that of the normal teeth 50.

It should be noted that the unique tooth 54 may be used in place of the mating marks 7, 8, and 9 on the belt 4.

Figure 15:
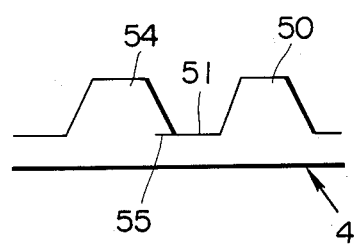
FIG. 15 is a side view of a first modified belt applied to the fifth embodiment.

FIG. 15 shows a first modified belt 4 applied to the embodiment of FIG. 14. In this belt 4, the base of the unique tooth 54 has a cut 55 in the plane of the floor surface between the teeth 50 and 54. The unique tooth 54 may be equal in dimensions to the other normal teeth 50. As a result of the cut 55, the tooth 54 will break more easily than the normal teeth 50. Since the position of the cut 55 is the base of the tooth 54, the tooth 54 will break at its base. When the base of the tooth 54 breaks, the tooth 54 will be displaced to a great extent and so will meet the sensing probe 15 (see FIG. 3) reliably.

Figure 16:
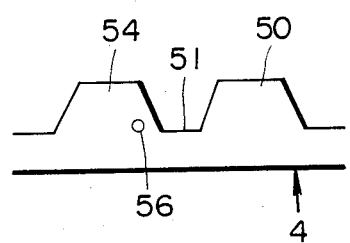
FIG. 16 is a side view of a second modified belt applied to the fifth embodiment.

FIG. 16 shows a second modified belt 4 applied to the embodiment of FIG. 14. In this belt 4, the base of the unique tooth 54 has a small hole 56 at a point on the plane of the floor 51 of the belt 4, i.e., at the level of the flat surface between the teeth 50 and 54. The unique tooth 54 may be equal in size to the other normal teeth 50. As a result of the hole 56, the tooth will breaks more easily than the normal teeth 50. Since the hole 56 is in the base of the tooth 54, the tooth 54 will break at its base.

Figure 17:
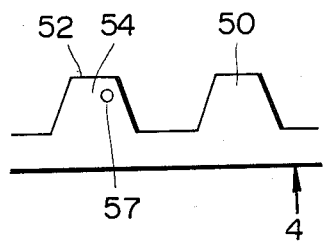
FIG. 17 is a side view of a third modified belt applied to the fifth embodiment.

FIG. 17 shows a third modified belt 4 applied to the embodiment of FIG. 14. In this belt 4, an iron pin 57 is embedded in the tooth 54 near the top surface 52 of the tooth 54. The unique tooth 54 may be equal in size to the other normal teeth 50. Since the centrifugal force exerted on the unique tooth 54 is greater than that exerted on the normal teeth 50 to a degree corresponding to the weight of the iron pin 57, the tooth 54 will break before the other teeth 50. The tooth 54 will break at its base. As a result of the great centrifugal force, the broken tooth 54 will be displaced to an extent larger than that in the first and second modified belts. This large displacement of the broken tooth 54 enables more reliable sensing of the breakage of the tooth 54.

It should be understood that two or more kinds of the teeth 54 of FIGS. 14 to 17 may also be formed on the belt 4.

Figure 18:
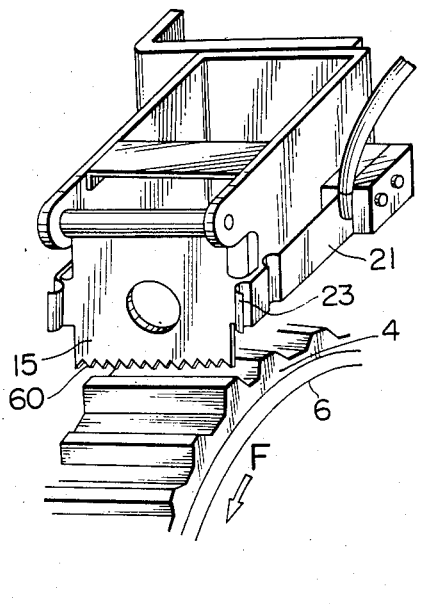
FIG. 18 is a perspective view of a sensing device including a modified sensing probe, a belt, and a pulley according to this invention.
Figure 19:
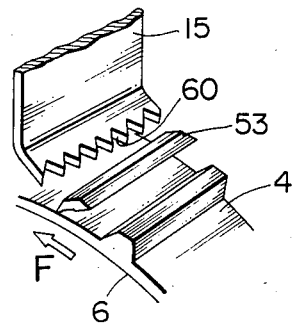
FIG. 19 is a perspective view of an essential portion of the sensing probe, the belt, and the pulley of FIG. 18.

FIGS. 18 to 21 show a modified sensing probe 15. As shown in FIGS. 18 and 19, the free edge 60 of this sensing probe 15 close to the belt 4 is serrated. Each tooth of this serration has a sharp edge. As best shown in FIG. 19, the sensing probe 15 is bent along a line near its free edge 60 such that the teeth of the serration essentially face in the direction opposite to the direction F of movement of the belt 4.

Figure 20:
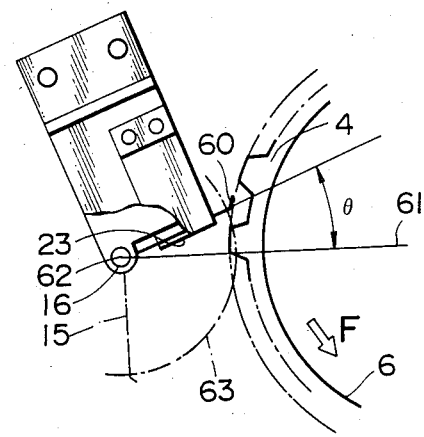
FIG. 20 is a front view, partly in section, of the sensing device, the belt, and the pulley of FIG. 18.

As shown in FIG. 20, when the sensing probe 15 is in the normal position, the direction of the sensing probe 15 except its edge 60 deviates from the line connecting the axis 61 of the idler pulley 6 and the axis 62 of the pin 16 at a preset acute angle $\theta$. The locus 63 of the free edge 60 in respect of pivot of the sensing probe 15 has a section inward of the top of teeth on the belt 4 but outward of the floor of the belt 4 between the teeth.

The sensing probe 15 is preferably composed of a thin steel plate so that the sensing probe 15 can deform to absorb the overlap between the locus 63 of its free edge 60 and the top of the teeth on the belt 4 to some degree.

This modified sensing probe 15 operates as follows. Assuming that one tooth 53 on the belt 4 cracks at its base facing rearward with respect to movement of the belt 4. As shown in FIG. 19, during rotation about the idler pulley 6, this damaged tooth 53 moves radially outward from its normal position and thereby collides with the free edge 60 of the sensing probe 15.

Since the free edge 60 is formed with sharp teeth, the free edge 60 sticks in the damaged belt tooth 53 upon collision with the latter. Note that the belt 4 is made of rubber. This resulting engagement of the free edge 60 with the damaged tooth 53 allows the sensing probe 15 to pivot and also the free edge 60 to approach the idler pulley 6 in accordance with movement of the belt 4.

Figure 21:
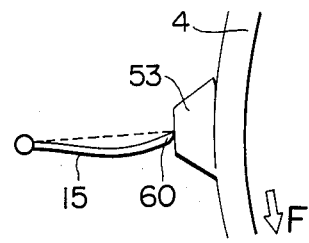
FIG. 21 is a side view of the sensing probe, the belt, and the pulley of FIG. 18.
Figure 22:
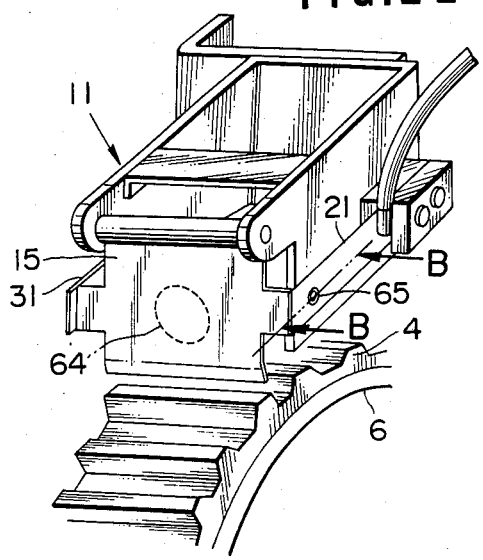
FIG. 22 is a perspective view of a sensing device, a belt, and a pulley according to a sixth embodiment of this invention.
Figure 23:
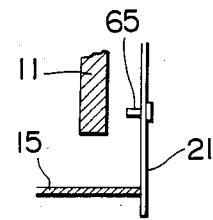
FIG. 23 is a cross-sectional view taken along the line B—B of FIG. 22.

While the free edge 60 approaches the idler pulley 6 and moves within a range inward of the top of normal teeth 50 on the belt 4, the free edge 60 further moves in to the damaged tooth 53 and more firmly engages the latter. During this movement, as shown in FIG. 21, the sensing probe 15 is curved by reaction so that an excessively strong force is prevented from acting on the sensing probe 15.

Pivot of the sensing probe 15 in accordance with movement of the belt 4 enables the sensing probe 15 to disengages from the hook 23 on the contact strip 21 (see FIGS. 18 and 20). Finally, the sensing probe 15 separates from the damaged tooth 53 on the belt 4 as shown by the broken line in FIG. 20.

In this way, the sharply-edged serration of the sensing probe 15 ensures reliable engagement between the sensing probe 15 and the damaged belt tooth 53. This results in reliable detection of damage to teeth on the belt 4.

FIGS. 22 to 25 show a sixth embodiment of this invention, which is similar to the embodiment of FIGS. 1 to 8 except for the following design changes.

The sensing probe 15 is made of insulating material, such as a plastic. The sensing probe 15 has no central opening. As shown in the phantom line of FIG. 22, a magnetic disc 64 is embedded in the sensing probe 15.

Contact strips 21 and 31 have no hook. The contact strips 21 and 31 are provided with contact points 65 and 66 projecting toward the parallel walls of the main body 11.

When the sensing probe 15 is in its normal position, the contact strips 21 and 31 abut the sensing probe 15 and are thereby held in their normal positions where the contact points 65 and 66 separate from the parallel walls of the main body 11. When the sensing probe 15 moves out of its normal position and disengages from the contact strips 21 and 31, the contact strips 21 and 31 move from their normal positions due to their resiliency until the contact points 65 and 66 reach the parallel walls of the main body 11. In this way, switching operation is performed. Once the contact strips 21 and 31 separate from the sensing probe 15 and move out of their normal positions, the strips 21 and 31 prevent the probe 15 from returning to its normal position.

Figure 24:
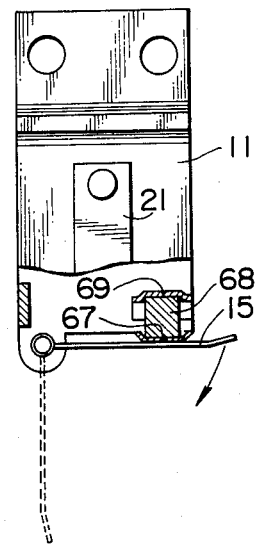
FIG. 24 is a front view, partly in section, of the sensing device of FIG. 22.
Figure 25:
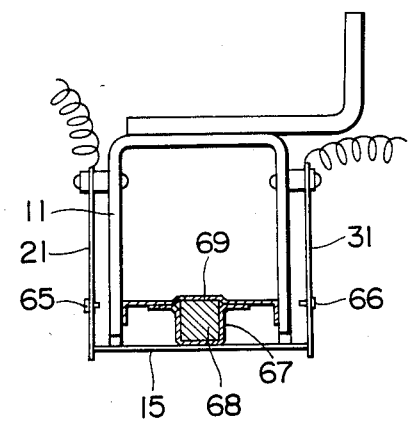
FIG. 25 is a side view of the sensing device of FIG. 22.

As shown in FIGS. 24 and 25, a retainer 67 fixes a magnet 68 to a cross member 69 extending between and secured to the parallel walls of the main body 11. The magnet 68 is preferably located adjacent the magnetic disc 64 when the sensing probe 15 is in its normal position. The magnet 68 attracts the magnetic disc 64 and thereby serves to hold the sensing probe 15 in its normal position, with a preset force, where the sensing probe 15 is pressed against the retainer 67 extending between the magnet 68 and the sensing probe 15. This holding force is preferably 20G.

When a damaged tooth on the belt 4 collides with the sensing probe 15 and exerts an impact force stronger than the holding force, the sensing probe 15 disengages from the contact strip 21 and 31 so that the contact points 65 and 66 contact the parallel walls of the main body 11. In this way, damage to teeth on the belt 4 is detected.

Specifically, a force effective to hold and return the sensing probe 15 to its normal position depends on the result of a force by the magnet 68 and a force by the resiliency of the contact strips 21 and 31 while the sensing probe 15 remains in contact with the contact strips 21 and 31. This holding and returning force depends solely on the force by the magnet 68 when the sensing probe 15 disengages from the contact strips 21 and 31. As show by the broken line 70 in FIG. 26, this holding and returning force decreases at high rates in accordance with increases in displacement of the sensing probe 15 from its normal position, since the force by the magnet 68 is inversely proportional to the distance between the magnetic disc 64 and the magnet 68. Therefore, once the sensing probe 15 slightly moves from its normal position, the probe 15 can easily disengage from the contact strips 21 and 31. In the case of the embodiment of FIGS. 1 to 8, a corresponding holding and returning force varies as shown by the solid curve 71 in FIG. 26.

Figure 27:
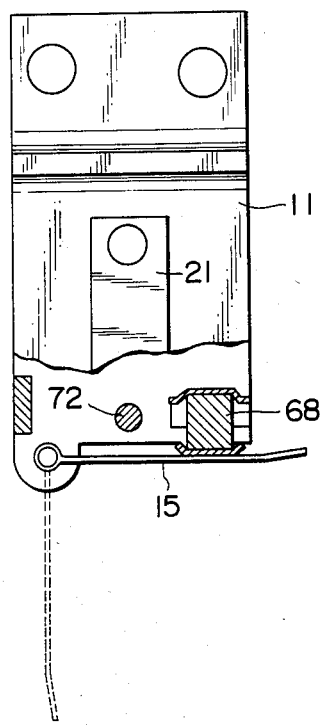
FIG. 27 is a front view, partly in section, of a sensing device according to a seventh embodiment of this invention.
Figure 28:
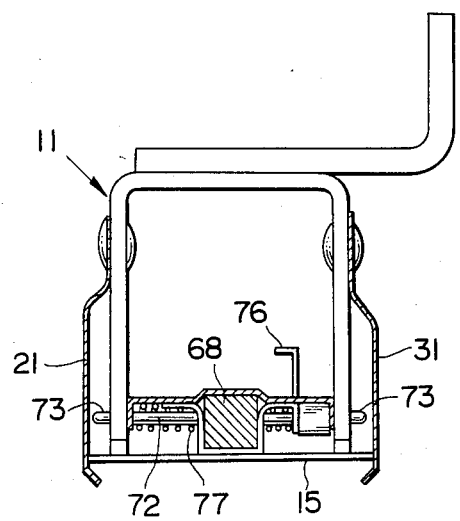
FIG. 28 is a side view of the sensing device of FIG. 27.
Figure 29:
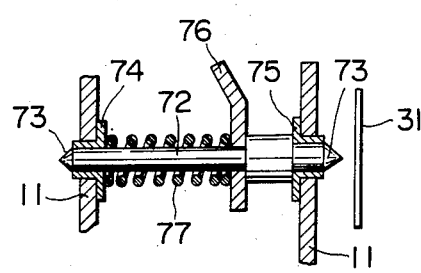
FIG. 29 is a sectional view of an essential portion of the sensing device of FIG. 27.

FIGS. 27 to 29 show a seventh embodiment of this invention, which is similar to the embodiment of FIGS. 22 to 25 except for the following design changes.

As best shown in FIG. 28, one end of each of the contact strips 21 and 31 is directly fixed and electrically connected to the main body 11. The free ends of the contact strips 21 and 31 normally abut the sensing probe 15. The free edges of the contact strips 21 and 31 are bent inward to stably hold the sensing probe 15 in its normal position.

As shown in FIGS. 27 to 29, a contact rod 72 is mounted on the main body 11. Opposite ends 73 of the contact rod 72 project from the parallel walls of the main body 11 toward the contact strips 21 and 31, as shown in FIGS. 28 and 29. When the contact strips 21 and 31 are in their normal positions, the contact projections 73 separate from the contact strips 21 and 31.

As shown in FIG. 29, grommets 74 and 75 support the contact rod 72 on the parallel walls of the main body 11. These grommets 74 and 75 are made of insulating material to electrically separate the contact rod 72 from the main body 11. As shown in FIGS. 28 and 29, a terminal 76 from which a lead (not shown) extends is connected to the contact rod 72. As best shown in FIG. 29, a spring 77 urges the contact rod 72 to hold the contact rod 72 fixed to the main body 11.

When the sensing probe 15 moves out of its normal position and disengages from the contact strips 21 and 31 as a result of collision with a damaged tooth on the belt, the contact strips 21 and 31 move due to their resiliency from their normal positions and then reach the contact projections 73. In this way, the switch including the contact rod 72 and the contact strips 21 and 31 is closed.

Figure 26:
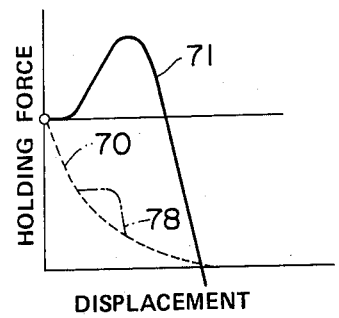
FIG. 26 is a graph of the relationship between displacement of the sensing probe and a force acting to hold and return the sensing probe.

Since the free edges of the contact strips 21 and 31 are bent as described previously, the relationship between a force effective to hold and return the sensing probe 15 to its normal position and a displacement of the sensing probe 15 from its normal position deviates from the corresponding relationship in the embodiment of Figs. 22 to 25 as shown by the broken line 78 in FIG. 26.

To detach the contact rod 72 from the main body 11 for replacement, the contact rod 72 is forcedly moved in the direction of compressing the spring 77 until its end 73 goes out of the grommet 74. Then, the contact rod 72 is inclined. Next, the other end 73 is moved out of the grommet 75.

Figure 30:
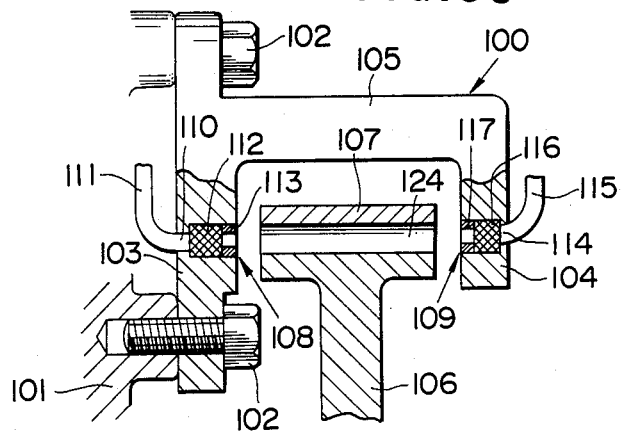
FIG. 30 is a sectional view of an eighth embodiment of this invention.
Figure 31:
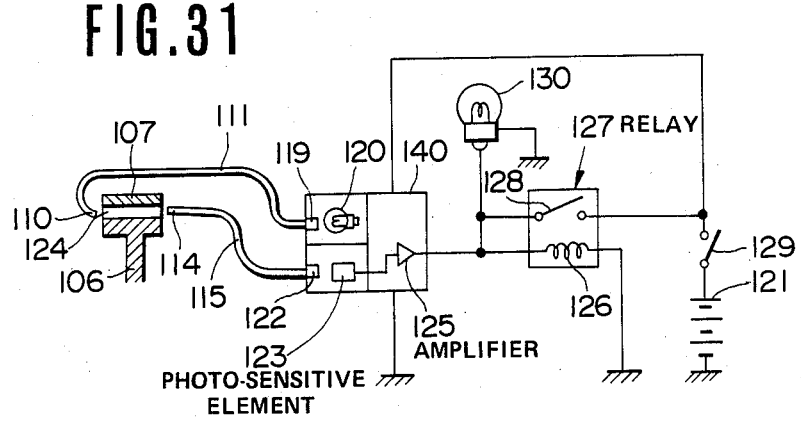
FIG. 31 is a diagram of the eighth embodiment.

FIGS. 30 and 31 show an eighth embodiment of this invention. As shown in FIG. 30, a U-shaped frame 100 is attached to an engine block 101 by means of bolts 102. The frame 100 includes a pair of parallel walls 103 and 104, and a cross member 105 connecting the parallel walls 103 and 104. A portion of a cam pulley 106 and a portion of a timing belt 107 in engagement with each other extend between the parallel walls 103 and 104.

Holes 108 and 109 extend through the parallel walls 103 and 104 respectively. These holes 108 and 109 align with each other. One end 110 of an optical fiber 111 extends into the hole 108. This optical fiber end 110 is fixed to the wall 103 by means of adhesive hardener 112 and a washer 113. One end 114 of another optical fiber 115 extends into the other hole 109. This optical fiber end 114 is fixed to the other wall 104 by means of adhesive hardener 116 and a washer 117. These optical fiber ends 110 and 114 axially align with each other. While the belt 107 is moving, teeth on the belt 107 periodically cross the straight path connecting these optical fiber ends 110 and 114.

As shown in FIG. 31, the other end 119 of the optical fiber 111 is optically connected to a light source 120, such as a bulb. A power supply 121 activates the source 120 so that the source 120 emits light. The optical fiber 111 guides the light from the source 120 to the fiber end 110 before the light exists from the end 110. The other end 122 of the optical fiber 115 is optically connected to a photo-sensitive element 123, such as a phototransistor. When light enters the fiber end 114, the optical fiber 115 guides the light from the end 114 to the photo-sensitive element 123, which converts the light into a corresponding electrical signal.

In the case where all of teeth on the belt 107 are normal, the straight path connecting the fiber ends 110 and 114 remains blocked by the teeth and lands between grooves in the cam pulley 106. Note that mesh between the teeth on the belt 107 and the lands on the cam pulley 106 has substantially no clearance. When a tooth breaks off the belt 107, an opening 124 is thereby formed between the belt 107 and the pulley 106 as shown in FIGS. 30 and 31. This opening 124 enables or opens the straight path connecting the fiber ends 110 and 114. In this case, light is transmitted from the fiber end 110 to the fiber end 114 via the opening 124.

As shown in FIG. 31, the input terminal of an amplifier 125 is connected to the photo-sensitive element 123. The output terminal of the amplifier 125 is connected to the control winding 126 of a relay 127. The amplifier 125 establishes the electrical signal from the photo-sensitive element 123 at a preset level adequate to control the switch 128 of the relay 127. One terminal of the relay switch 128 is connected to the power supply 121 via an engine key switch 129. The other terminal of the relay switch 128 is connected to an alarm lamp 130. In the case of a vehicle engine, this alarm lamp 130 is placed on the instrument panel inside the vehicle in a manner similar to usual alarm indications.

The light source 120, the photo-sensitive element 123, and the amplifier 125 are preferably disposed within a casing 140 and distant from the engine block 101 in order to prevent exposure to heat and vibration from the engine block 101.

When a current flows through the relay winding 126, the relay switch 128 is closed and therefore the alarm lamp 130 is activated by the power supply 121. Note that the engine key switch 129 is normally closed. In order to keep the alarm lamp 130 activated, the relay winding 126 and the relay switch 128 are connected in such a way as to provide the relay 127 with self-holding function. Opening of the engine key switch 129 cancels the self-holding function and thus enables the alarm lamp 130 to be deactivated.

Figure 32:
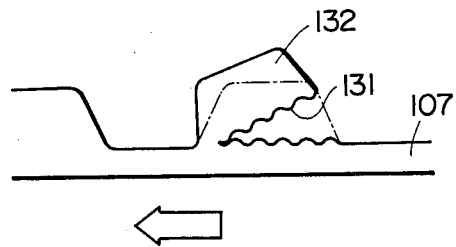
FIG. 32 is a side view of a belt having a broken tooth.
Figure 33:
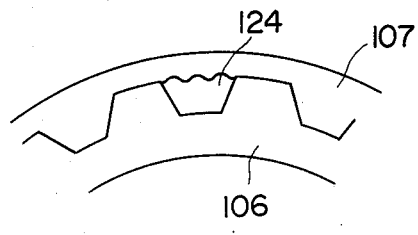
FIG. 33 is a side view of a pulley and a belt between which an opening is formed as a result of the absence of a belt tooth.

In most cases, damage to the belt 107 goes through several stages as follows. In a first stage, the base 131 of a tooth 132 on the belt 107 cracks as shown in FIG. 32. In a second stage, this tooth 132 peels. In a third stage, the tooth 132 comes off the belt 107. As shown in FIG. 33, this results in an opening 124 between the belt 107 and the cam pulley 106 which were in mesh without any clearance before the opening 124 appeared. In a fourth stage, other teeth break off the belt 107. This results in slippage between the belt 107 and the cam pulley 106.

In operation, when the opening 124 moves across the straight path connecting the fiber ends 110 and 114 (see FIGS. 30 and 31), the light is transmitted from the fiber end 110 to the fiber end 114 via this opening 124. Then, the light reaches the photo-sensitive element 123, which converts the light into an electrical signal. In response to this electrical signal, the amplifier 125 allows a current to flow through the relay winding 126.

As a result, the relay switch 128 is closed. Closing of the relay switch 128 allows the power supply 121 to activate the alarm lamp 130. In this way, the alarm lamp 130 reports the occurrence of damage to the belt tooth. Until the engine key switch 129 is opened, the self-holding function of the relay 127 keeps the relay switch 128 closed and thereby holds the alarm lamp 130 activated.

Figure 34:
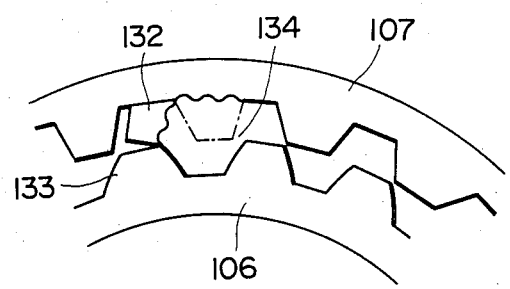
FIG. 34 is a side view of a pulley and a belt between which a gap is formed as a result of displacement of a broken belt tooth.

As shown in FIG. 34, the broken tooth 132 is sometimes sandwiched between the body of the belt 107 and a land 133 on the pulley 106 so that a gap 134 is formed between the belt 107 and the pulley 106 around the broken tooth 132. In this case, since the light is transmitted from the fiber end 110 to the fiber and 114 via the gap 134, the alarm lamp 130 is activated.

Sensing position may be near a location of engagement between the belt 107 and a pulley other than the cam pulley 106.

Detection of an opening or a gap resulting from breakage of a belt tooth may use ultrasonic wave in place of light.

This embodiment can be combined with one of the embodiments of FIGS. 14, 15, 16, and 17.

Figure 35:
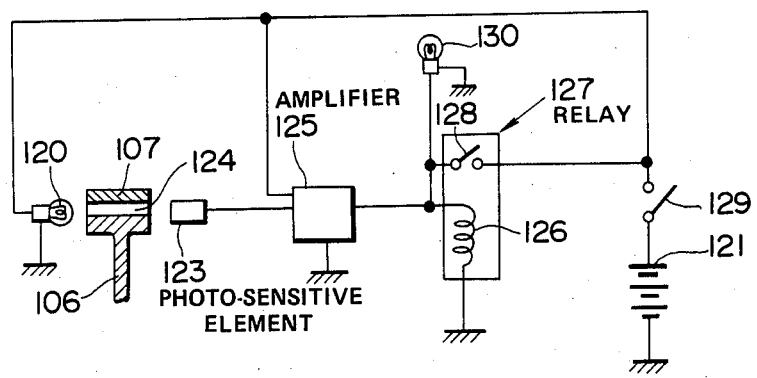
FIG. 35 is a diagram of a ninth embodiment of this invention.

FIG. 35 shows a ninth embodiment of this invention. This embodiment is similar to the embodiment of FIGS. 30 and 31 except for design changes indicated below.

In this embodiment, the light source 120 and the photo-sensitive element 123 are placed near a location of engagement between the cam pulley 106 and the belt 107. The light source 120 and the photo-sensitive element 123 align axially with respect to the pulley. The location of engagement between the pulley 106 and the belt 107 is interposed in a straight path connecting the light source 120 and the photo-sensitive element 123.

When an opening 124 appears between the belt 107 and the pulley 106 as a result of breakage of a belt tooth, light is transmitted from the light source 120 to the photo-sensitive element 123 through the opening 124.

What is claimed is:

1. In combination:
  (a) a pulley having evenly spaced grooves;
  (b) a belt formed with evenly spaced teeth which mesh with the grooves on the pulley; and
  (c) means, located near the belt, for sensing deformation of the belt resulting from damage to at least one of the teeth of the belt,
  wherein said sensing means comprises:
    a switch including a movable contact strip, a first contact section on the strip, a fixed body, and a second contact section on the body; and
    a sensing probe positioned to contact the moving belt when the belt deforms such that the sensing probe is moved from a normal position by the moving belt when the belt deforms, wherein when the sensing probe is in its normal position, the sensing probe directly engages the strip and holds the strip in a position in which the first contact section separates from the second contact section, and wherein when the sensing probe is moved from its normal position, the sensing probe disengages from the strip and thus the strip moves to a position in which the first contact section contacts the second contact section.

2. In combination as recited in claim 1, wherein the sensing probe has a central opening.

3. In combination as recited in claim 1, wherein the sensing probe is formed with serration.

4. In combination as recited in claim 3, wherein the serration of the sensing probe has teeth each formed with a sharp edge.

5. A combination as recited in claim 1, further comprising a magnetic member embedded in the sensing probe, and a magnet fixed to the body and acting on the magnetic member to releasably hold the sensing probe in its normal position.

6. A combination as recited in claim 1, wherein the strip has a resiliency, and the strip moves due to its resiliency when the sensing probe disengages from the strip.

7. A combination as recited in claim 1, wherein the strip has an easily releasable hook which gently holds the sensing probe when the sensing probe is in its normal position.

* * * * *